M. F. GEER & R. C. LEAKE.
SELECTIVE SIGNALING DEVICE.
APPLICATION FILED DEC. 8, 1910.

1,118,120.

Patented Nov. 24, 1914.

WITNESSES:
George T. Whitney
Henrietta Vosburgh

Maurice F. Geer
Richard C. Leake
INVENTORS

BY Lyman E. Dodge
ATTORNEY.

M. F. GEER & R. C. LEAKE.
SELECTIVE SIGNALING DEVICE.
APPLICATION FILED DEC. 8, 1910.

1,118,120.

Patented Nov. 24, 1914
6 SHEETS—SHEET 4.

WITNESSES:
George T. Whitney
Henrietta Vosburgh

Maurice F. Geer
Richard C. Leake
INVENTORS

BY Lyman E. Dodge
ATTORNEY.

M. F. GEER & R. C. LEAKE.
SELECTIVE SIGNALING DEVICE.
APPLICATION FILED DEC. 8, 1910.

1,118,120.

Patented Nov. 24, 1914.
6 SHEETS—SHEET 6.

WITNESSES
Lillian L. Phillips
Mary G. Dalbey

INVENTORS
Maurice F. Geer
Richard C. Leake
BY
Lyman E. Dodge
ATTORNEY

UNITED STATES PATENT OFFICE.

MAURICE F. GEER AND RICHARD C. LEAKE, OF ROCHESTER, NEW YORK, ASSIGNORS TO GENERAL RAILWAY SIGNAL COMPANY, OF GATES, NEW YORK, A CORPORATION OF NEW YORK.

SELECTIVE SIGNALING DEVICE.

1,118,120.  Specification of Letters Patent.  Patented Nov. 24, 1914.

Application filed December 8, 1910. Serial No. 596,252.

*To all whom it may concern:*

Be it known that we, MAURICE F. GEER and RICHARD C. LEAKE, citizens of the United States, and residents of the city of Rochester, in the county of Monroe and State of New York, have invented a new and useful Selective Signaling Device, of which the following is a specification.

This invention relates to that class of devices which an operator at a central point may actuate at remote points by the same impulses of electricity to cause one and one only of a number of the devices at the remote points to be so actuated as to cause the operation of any other apparatus at the same station. Such devices are in the electrical art called selective devices, and this invention therefore relates to a selective device, as the operator at the central station by its use can select that station at which he desires a certain operation to take place, such as the ringing of a bell, the moving of a semaphore, or the operation of any one of the countless devices which may be actuated by the intermediary of electricity.

The primary object of this invention is to produce a device which is absolutely reliable, as in devices of this character the prime requisite is certainty of action, and in this device certainty of action has been unquestionably obtained.

A further object of the invention is to obtain certainty of action with a minimum of parts, not only a minimum of moving parts, but also a minimum of fixed parts, for in a device of this character it is a desideratum that the parts should be few and simple, for the structure after being once installed must be maintained in its work from year to year by rather unskilled hands, so that the fewer the parts and the simpler they are formed the less liability there is for the device to require skilled attention.

A further object of the invention is the production of a device of the character described which shall occupy a very small space and be readily accessible, for all of its parts should be readily accessible and easily adjustable, so that in case the device does need attention it may be attended to with facility and despatch and the defect, if any, which may have caused it to be inspected and adjusted can be very readily determined.

A further object of the invention is to assemble in a unitary structure devices which have heretofore been separate and distinct mechanisms, for by so doing economy in material, economy in space and economy in time of inspection are attained, essential requisites in a device of this character of which there may be many under the care and supervision of one inspector. Heretofore in selective signaling systems the selective device has been constructed separate and distinct from the device directly actuated by current from the line wires, but the selective mechanism is this device is actuated directly by the means energized from the line wires and forms an integral part of it.

A further object of the invention is to so surround the vital actuating parts, which in a device of this character must be small and light and therefore easily disarranged by any foreign action, by such a combination of stops and guarding mechanisms as will prevent the actuating of the parts to such an extent as to throw them out of correct operating position by any accidental blow given to the device, or by an accidental impulse of electricity getting into the device which is more powerful than that ordinarily used to operate it.

A further object of the invention is to secure economy in the consumption of current needed to operate a device of this character, for by so doing we are enabled to operate many more of the devices with a given current consumption than we otherwise would be able, or we can operate a device at a greater distance from the central station than we otherwise would be able, both of which results are an important consideration in practical working.

A further object of the invention is to so construct a device of the character described that it may be operated by the use of only two line wires, which two line wires may also be used for the transmission of telephonic messages without interfering in any manner with the operation of the selective device and without an interference by the selective device with the operation of the telephones. This object to be attained without the employment or intervention of complicated, cumbersome and confusing telephone jacks and plugs and cords.

A further object of the invention is the production of a substantial device of the character stated which may be manufactured, installed and maintained at an extremely low cost.

A further object of the invention is to so construct a device of the character stated that not only may the selective device be operated from energy supplied at the central station but the apparatus at the remote station set in operation by the selective device may be operated by energy derived from the central station.

Other objects and advantages will appear in the following specification and the novel features of the device will be particularly pointed out in the appended claims.

The invention consists in the combinations, constructions and arrangements herein described and claimed.

In describing the invention in detail reference is had to the accompanying drawings, wherein like reference characters denote corresponding parts throughout the several views, in which.

*Construction.*—1 designates the base which should be made of a very light but extremely strong non-magnetic material. Around the base extends the flange $1^1$, which forms a chamber for the noninductive resistance 2, through holes in the base are placed the insulating bushings 3 through which the wires leading to the local contacts and line wires are passed. $1^2$ designates a projection from the base having a hole $1^3$ therethrough; $1^4$ designates a flange which completely encircles the front face of the base and which forms a guide for the cover 4: $1^5$ designates holes through the flange $1^4$ adapted to receive pins $4^1$ fastened to the cover and together with the lug $4^2$ and the projection $1^2$ to form a means for locking the cover to the base to prevent access to the internal mechanism as the arm of a padlock may be inserted through the hole $1^3$, thereby preventing any but the proper parties from gaining access to the interior. The cover 4 may have a glass 107 set in its front face, so that a view of the interior mechanism may be had without removing the cover; 106 designates a rubber gasket placed around the inside of the flange $1^4$ for the cover to bear against and thus prevent the entrance of dust into the inside of the case; 99 designates holes through the base by which the device may be fastened upright by means of screws to a wall; $1^6$ designates pillars extending forward from the base by which the internal mechanism is supported. To the top pillars $1^6$ is attached the mounting bar 5 by means of the spacer posts 101 whose inner ends are screw threaded.

Figure 2:
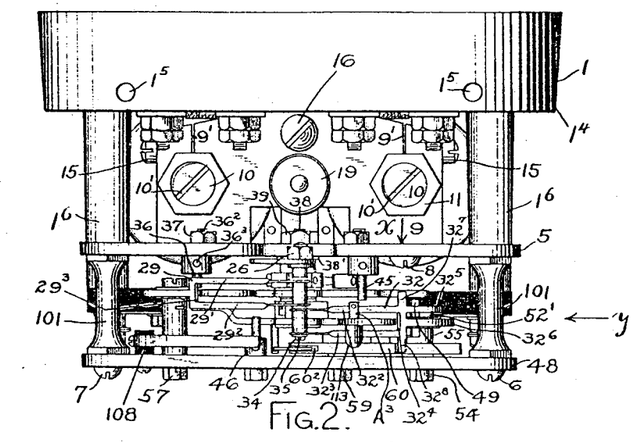
Fig. 2 is a top view of the assembled device with the inclosing cover removed.
Figures 10, 12, 18, 19, 22, 23, 27:
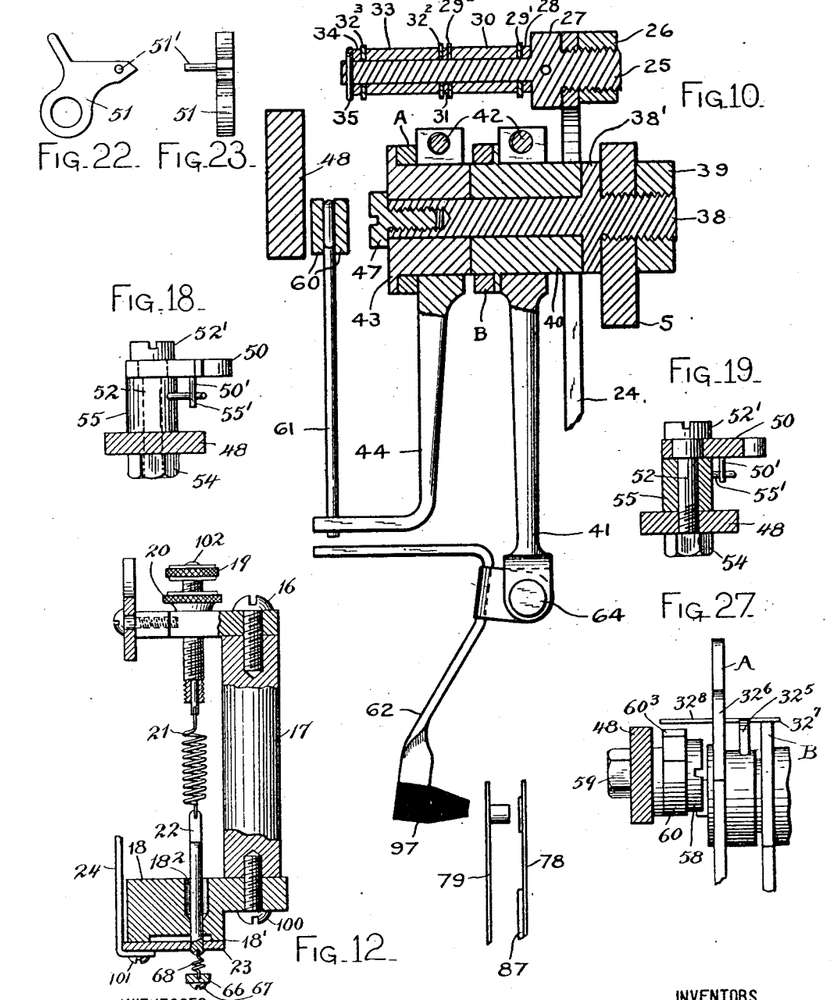
Fig. 10, is a view of the parts of the plane of section A—B, Fig. 9, a few parts being shown in elevation to render the view more clear.
Fig. 12 is a fragmentary cross sectional view on the line C—D of Fig. 5.
Fig. 18 is a side elevational detail view of a part.
Fig. 19 is a cross sectional view of the parts shown in Fig. 18.
Figs. 22 and 23 are a side and an end view respectively of a part.
Fig. 27 is a fragmentary side elevation looking in the direction of the arrow $y$ Fig. 2.
Figure 11:
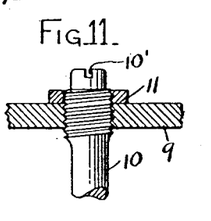
Fig. 11 is a detail view of a connection.

To the mounting bar 5 is attached by means of screws 8, one shown in Fig. 2 and the other in Fig. 12. the pole plate 9, which has therethrough two screw threaded holes through which extend the cores 10 best shown in Fig. 11, which are formed with a screw thread to engage the screw thread in the pole plate, and which have a slot $10^1$ to receive a screw driver to turn them so that the position of the cores 10 in the pole plate 9 may be varied. 11 designates a lock-nut engaging the screw threads of the core in order to lock them in adjusted position. To the bottom of the cores are attached the collars 12 for increasing the polar surfaces and for holding the insulating disks 13, which disks hold the energizing coils 14 on the cores. 15 designates screws for causing the pole plate to bind the core in place, which they may do by reason of the slot $9^1$ extending from the edge of the pole plate to the hole in the pole plate through which the core extends.

Figures 5, 6, 28, 29:
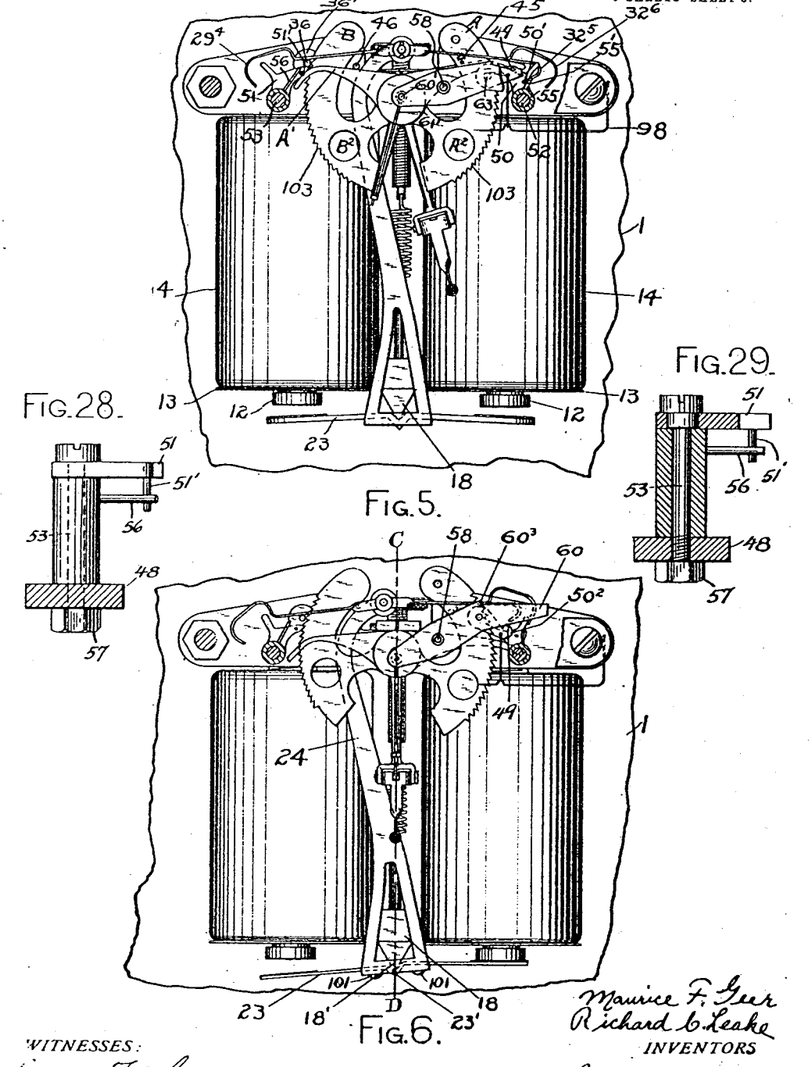
Fig. 5 is a fragmentary front elevation of the internal mechanism.
Fig. 6 is a fragmentary front elevation showing the internal mechanism in the position assumed when a combination is set up and a local contact closed.
Fig. 28 is a detail view of a part.
Fig. 29 is a cross sectional view of the part shown in Fig. 28.

As best shown in Fig. 12 16 designates a screw extending through the pole plate and into the end of a cylindrical permanent magnet 17 which bears at its lower end the knife edge bearing plate 18, fastened to it by means of the screw 100 and having the knife edge bearing $18^1$ and the hole $18^2$ therethrough; 19 designates the head of an adjusting screw which passes through a screw threaded hole in the pole plate and bears a lock nut 20 for holding it in adjusted position; 102 designates a cylindrical rod passing through the adjusting screw 19 which is bored out to receive it, the rod being headed at the upper end to prevent it from passing through the screw, this rod acts as a swivel and does not rotate when the screw 19 is turned to adjust it longitudinally; 21 designates a tension spring interposed between the swivel 102 and the centering rod 22, which is fastened to the armature 23, and by the tension of the spring 21 the armature is maintained in central position with its ends at equal distances from the ends of the cores. the armature 23 has a depression $23^1$ best shown in Figs. 5 and 6 formed in its center to bear on the knife edge $18^1$.

As best shown in Fig. 12 24 designates an arm attached rigidly to the armature 23 by screws 101, and extending upwardly and bearing at its top end a post 25 as shown in Fig. 10, fastened to it by means of a screw thread on the end of the post and a nut 26; 27 designates a shoulder on the post 25 between which and the nut 26 the arm 24 is clamped; 28 designates a washer on the post 25 interposed between the shoulder 27 and one arm of a driving pawl 29, which has a hole therethrough, through which the post 25 extends; 30 designates a spacer interposed between the arm $29^1$ of the driving pawl 29 and the arm $29^2$ of the driving pawl 29; 31 designates a spacing washer between the arm $29^2$ and the arm $32^2$ of driving pawl 32; 33 designates a spacing washer between the arm $32^2$ and the arm $32^3$ of the driving pawl 32; 34 designates a washer between the arm $32^3$ and the cotter pin 35 inserted in a hole in the end of the post 25, the cotter pin holding the washers and spacers and driving pawls in place upon the post 25, but allowing a free movement of the driving pawls about the axis of the post 25.

Figures 9, 24, 26:
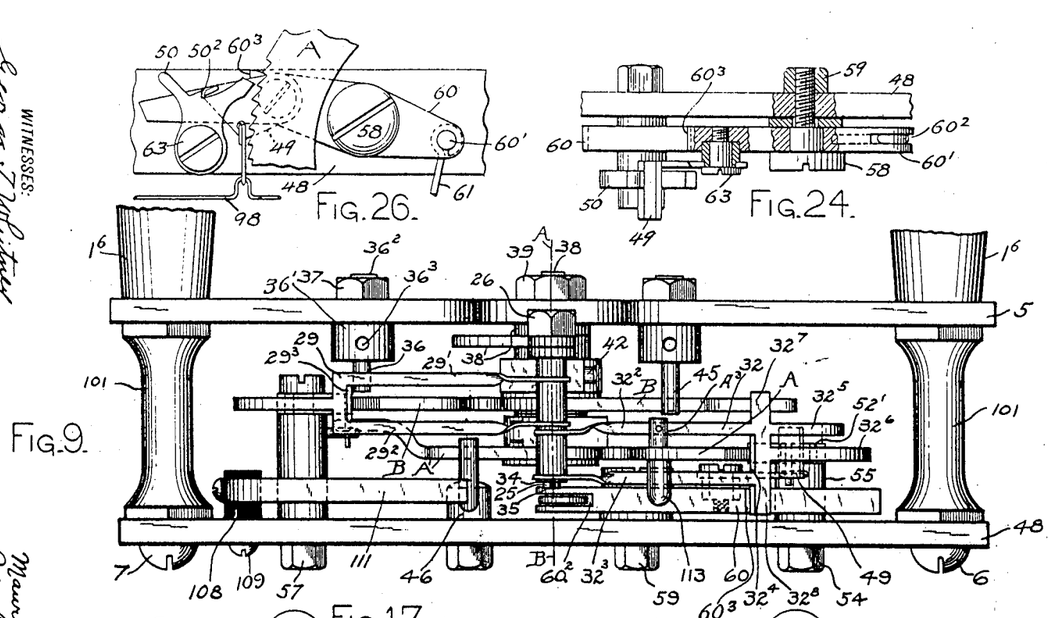
Fig. 9 is a detail plan view of part of the mechanism shown by Fig. 2.
Fig. 24 is a plan view of the parts shown in Fig. 17, but in a different operative relation.
Figs. 25 and 26 are views of the parts shown in Fig. 17 but in a different operative relation.

As best shown in Figs. 5 and 9, 36 constitutes a means for preventing the driving pawl 29 from dropping too low, and consists of a pin in the center of a hub $36^1$, which bears on its other side at a point not in line with the pin 36 a pin $36^2$, which is screw threaded and passes through the mounting bar 5 and is clamped thereto by means of the nut 37; $36^3$ designates holes drilled radially through the hub for the insertion of an adjusting pin; $A^3$ designates a stop mounted on sector A to prevent driving pawl 32 from flying up over the other side of the center pin 25.

Figure 13:
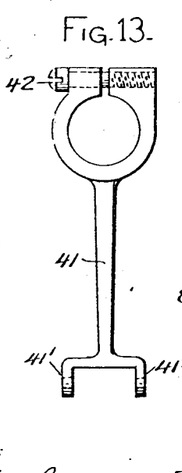
Figs. 13 and 14 are front and side elevational detail views of a part.
Figure 14:
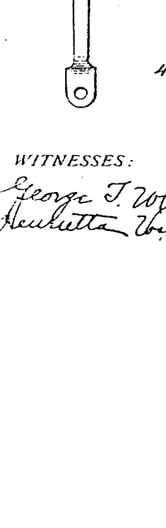
Figure 16:
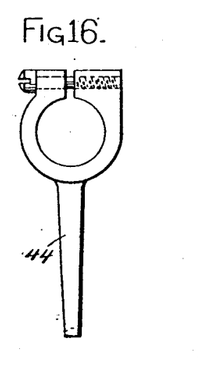

As best shown in Fig. 10 38 designates a shaft which is screw threaded on its inner end and bears a collar $38^1$, and which passes through the mounting bar 5 and is clamped thereto by means of the nut 39; 40 designates a bushing placed on the shaft 38 and free to rotate thereon, which has rigidly attached thereto the sector B and has mounted thereon a contact arm 41 shown in Figs. 13 and 14 capable of rotatable adjustment thereon, but when adjusted is held in the adjusted position by means of the screw 42 passing through the two bifurcated ends of the arm 41, thus binding it to the bushing 40 so that the sector B will rotate with the arm 41. There is also rotatably mounted upon the shaft 38 the bushing 43 which is rigidly attached to the sector A and bears the arm 44 shown in Figs. 15 and 16 rotatably adjustable thereon in the same way that bushing 40 bears contact arm 41; 47 designates a screw in the end of the shaft 38 designed to keep the parts which are revolubly maintained upon shaft 38 from longitudinal movement.

45 designates a pin best shown in Figs. 5 and 9 which acts as a stop to prevent the sector B from rotating backwardly beyond normal position by contacting with the extreme outer end of said sector. This stop exactly as stop 36 is clamped on the mounting bar 5 and is adjustable in the same manner.

As best shown in Fig. 9 48 designates a front mounting bar which is clamped by means of screws 6 and 7 and spacer posts 101 to pillars $1^6$; 46 designates a stop fastened to the front bar 48 and is adapted to contact with the tail end A' of the sector A to prevent it from rotating backwardly beyond normal position.

Sectors A and B have teeth as 103 cut in their periphery as shown in Fig. 5 designed to contact with the edge $29^3$ of the driving pawl 29 and edge $32^4$ of driving pawl 32 and be rotated thereby step by step about the shaft 38.

Figure 17:
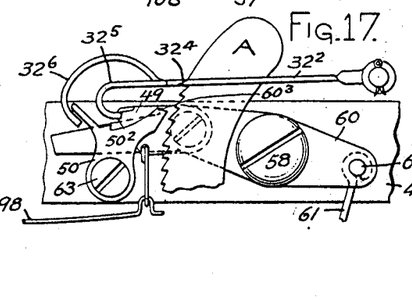
Fig. 17 is a fragmentary view looking in the direction of the arrow $x$, Fig. 2.

As best shown in Figs. 5 and 17, the driving pawl 32 has formed on its end the downwardly curved extending arm $32^5$, which is adapted to contact with the release dog 49 to throw it out of engagement with the holding pawl 50, which holding pawl 50 is contacted by the downwardly curved extending arm $32^6$ to throw it in contact with the sector A. As best shown in Fig. 5, driving pawl 29 has the downwardly curved extending arm $29^4$ which is adapted to contact with the holding pawl 51 and throw it into engagement with the sector B.

Figures 3, 4, 20, 21:
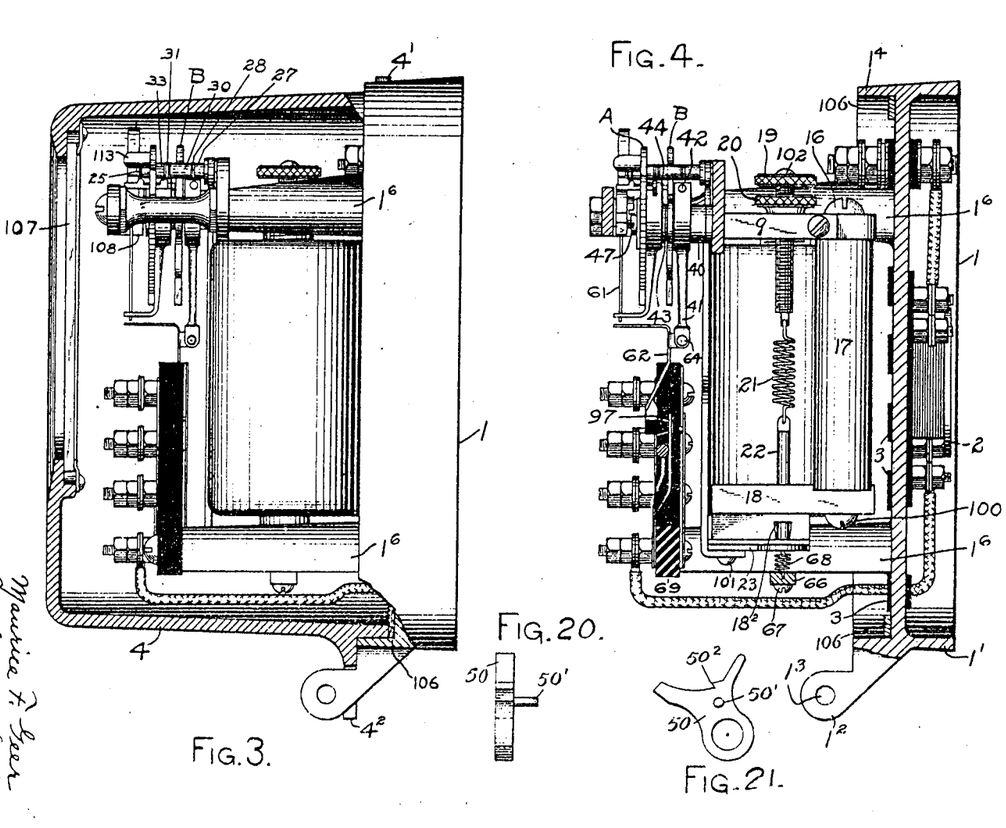
Fig. 3 is a side elevation of the assembled device with the inclosing cover in section and a lower corner of the base slightly broken away in order to show the form of joint between the cover and base.
Fig. 4 is a side elevational view from the right hand side of Fig. 2 with the base in section with the inclosing cover removed and with one of the coils removed, and certain of the front mounting pieces in section.
Figs. 20 and 21 are an end and a side view respectively of a part.

The holding pawl 50 shown in detail in Figs. 20 and 21 is mounted upon a pin 52 as shown in Figs. 18 and 19 and the holding pawl 51 best shown in Figs. 22 and 23 is mounted upon a pin 53 best shown in Figs. 28 and 29. 54 designates a nut which is screwed upon the outer end of the pin 52 after it passes through the front mounting bar 48. Between the front mounting bar 48 and the pawl 50 is the bushing 55 which bears a pin $55^1$, best shown in Figs. 18 and 19, which co-acting with the pin $50^1$ on holding pawl 50 prevents the holding pawl from flying back too far. The pin 52 has on its inner end next the head $52^1$ a circular enlargement of a size measured lengthwise of the pin slightly more than the thickness of the holding pawl 50, so that when the pin bearing the holding pawl and the bushing 55 is firmly clamped to the front mounting bar 48 the holding pawl will still be free to move about the axis of the pin 52. The holding pawl 51 as best shown in Figs. 28 and 29 is borne in like manner by the pin 53, and is held from flying back too far by the pin 56. The position of the pins 56 and $55^1$ can of course be readily adjusted by loosening the nuts 54 and 57 and rotating the bushing bearing the stop pins $55^1$ and 56 about the pins 52 and 53.

Mounted on a pin 58 as best shown in Fig. 24 and also well shown in Figs. 5, 6, 9 and 17 clamped to the front mount-bar by means of the nut 59 is a release arm 60; 61 designates a plunger held by means of a pin $60^1$ in a slot $60^2$ in one end of the release arm 60, and extending downward and through a hole in a right angled extension of plunger arm 44 as shown in Fig. 10 in such a manner as to come opposite the end of the extension 62 on the contact arm 41 when a proper combination is set up; 49 is a release dog pivoted on a pin 63 passing through the release arm 60 and adapted to throw holding pawl 50 out of engagement with the teeth of sector A, by engaging in the notch $50^2$. The release arm 60 has a tooth $60^3$ which lies in the path of arm $32^8$ at times, but normally below it as best shown in fragmentary view Fig. 27, due to the fact that arm $32^7$ rests upon the tail end of sector B, which end lies in a plane above the plane of the tooth $60^3$. The holding pawl 51 is adapted to be thrown out of engagement with the teeth 103 of sector B by being struck by the end $A^1$ of a sector A. The sector A as well as the sector B have each a hole $A^2$ and $B^2$ respectively, therethrough in which lead may be run in order to give the sectors more weight, although in practice sector A is the only one which needs to be weighted, as sector B has so little work to do that there is no difficulty in causing it to return to normal position when released from engagement with the holding pawl 51.

Figure 1:
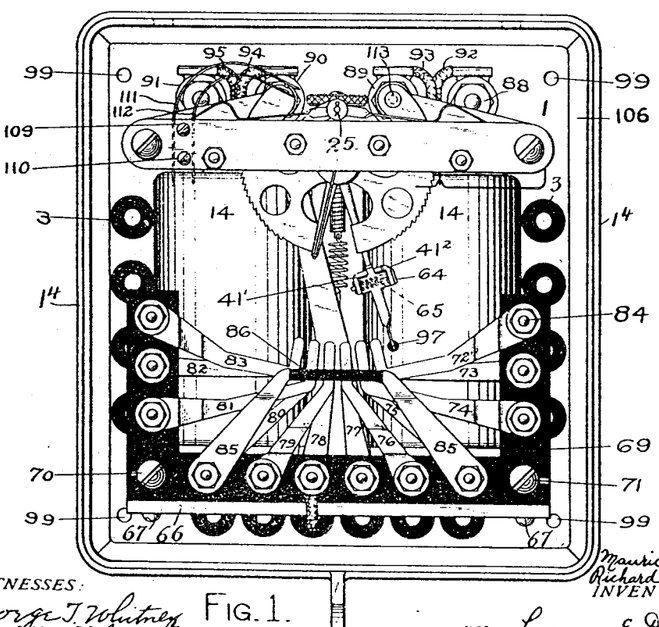
Figure 1 is a front elevation of the assembled device with the inclosing cover removed.

As best shown in Figs. 1 and 10 the extension arm 62 is borne on the contact arm 41 by means of a pin 64, which passes through the two arms $41^1$ and $41^2$ on the lower end of the contact arm, and is held outwardly by means of the torsion spring 65, which is wound about the pin 64 and has one end bearing on the extension arm 62, and the other end on the contact arm 41.

As best shown in Figs. 1, 4 and 12 66 designates a supporting bar, one end of which is fastened to the pillar $1^6$ on one side of the base by means of the screw 67, and the other end of which is similarly supported upon the pillar $1^6$ upon the other side of the base; 68 designates a compression spring borne by the bar 66 and bearing against the armature 23.

Figures 7, 8, 15:
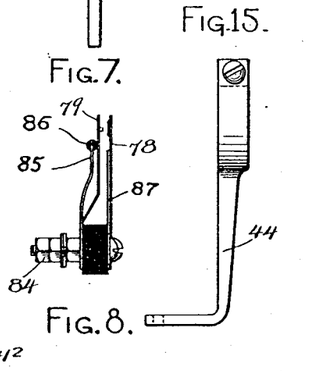
Fig. 7 is a back elevation.
Fig. 8 is a detail showing the construction and mounting of the local contacts.
Figs. 15 and 16 are side and front elevational detail views respectively of a part.

As best shown in Figs. 1, 3 and 8 the two lower pillars $1^6$ from the base also support by means of the hard rubber 69, which is fastened to the pillars by the screws 70 and 71, the contact strips 72, 73, 74, 75, 76, 77, 78, 79, 80, 81, 82 and 83, which contact strips are so formed and so arranged that they form pairs, that is, 72 and 73 are adapted to be contacted by pressure exerted on spring 72, as are likewise springs 74 and 75, each of the springs being attached to binding posts as 84 to which a wire may be connected; 85 designates a retaining arm which together with the retaining arm 85 on the other side of the device carries a retaining bar 86 of insulating material adapted to bear against and to hold the springs 72, 74, 76, 79, 81 and 83 in their proper inward position. On the other side of the insulating piece 69 are retaining metallic strips 87, which are on the inside of and hold the contact pieces 73, 75, 77, 78, 80 and 82 inwardly far enough so that the inside contact arms, such as 73, will not ordinarily bear against the outside contact arms, such as 72.

As best shown in Figs. 1, 2 and 7 at the top of the base are the binding screws 88, 89, 90 and 91 to the two outer of which, namely, 88, 91, are connected the two line wires through which the current travels to operate the device. The current travels when going in one direction from binding post 88 by means of the wire 92 to and through the coil 14 on the right hand side, leaving the coil by the wire 93, which is connected with binding post 89; from hence it passes to and through the noninductive resistance 2 shown in Fig. 7, and from hence to binding post 90, passing from there by means of the wire 94 to and through the coil 14 on the left hand side of the device leaving the said coil by the wire 95 binding post 91 and the other line wire. A connection 96 is shown in Fig. 7 from the central point of the noninductive resistance 2, passing to and through an insulating bushing 3 and connected with the binding post to which the contact piece 78 is attached.

As best shown in Figs. 1 and 9 to the front bar 48 is attached the insulating block 108 by means of the screws 109 and 110; 111 and 112 designate two springs attached to either side of block 108 which are bent in the manner shown so that their ends are close together but not in contact. A pin 113 is fastened to sector A so that it contacts with and depresses spring 111 when sector A has been moved sufficiently in one direction by driving pawl 32, causing spring 111 to contact with spring 112.

Figure 25:
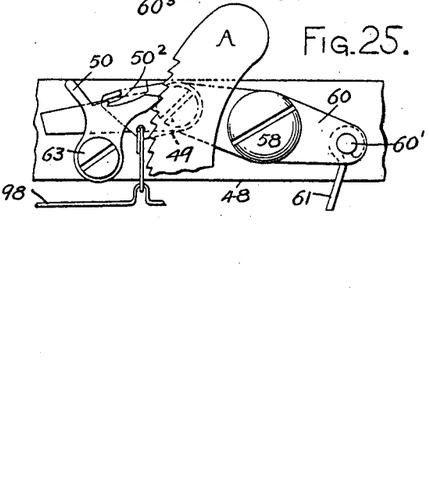

*Operation.*—If a wire conveying positive current be connected to the binding post 88 and the return path to the source of current be completed by a wire connected to the binding post 91, the two coils 14—14 will be energized, thereby magnetizing the cores 10 and so oscillating the armature 23 upon the knife edge $18^1$ so that the right hand end of the armature as shown in Fig. 6 will be drawn up to the right hand core 10 as the permanent magnet 17 so magnetizes the armature 23 that an opposite pole is created on the right hand end of armature 23 from that created by the coils 14—14 on the right hand core 10. The oscillating of the armature 22 causes the upper end of arm 24 to move to the left carrying with it driving pawl 32, which by means of the edge $32^4$ engages a tooth of sector A and causes the sector A to rotate in a direction counter clockwise about the shaft 38 as a pivot at the same time downwardly extending loop $32^5$ engages the end of the release dog 49 as shown in Fig. 17, relasing it from engagement with the notch $50^2$ of the holding pawl 50 and the downwardly extending loop $32^6$ engages with the upper end of the holding pawl 50, forcing it into engagement with a tooth on the sector A. When the current ceases the sector A remains in its moved position, being held therein by the action of the holding pawl 50, but the driving pawl 32 and the arm 24 and the armature 23 are drawn back to their normal position with both ends of the armature at equal distances from the lower ends of both cores by virtue of the tension of the spring 21 exerted upon the centering rod 22 which is fastened to the armature 23. A second impulse advances the sector another tooth and it could be so advanced step by step by successive impulses to the limit of its movement. When the driving pawl 32 is returned to normal position after actuating sector A, the release dog 49 falls upon the top of the tooth $50^2$ as shown in Fig. 25 as the holding pawl was moved forward into engagement with the teeth of sector A by the movement of the driving pawl 32, consequently, the holding pawl is not moved from in engagement with sector A.

When the sector A rotates about the shaft 38 as it is rigidly connected to bushing 43, it carries said bushing with it, and also carries with it the arm 44 which is tightly clamped to said bushing. If the combination which it is desired to set up on the particular machine is 3 steps on the A sector and 5 steps on the B sector, the A sector would be advanced 3 teeth carrying with it the arm 44 to such a point as would place it in operative position when the other parts of the mechanism are suitably actuated. After the A sector has been moved the requisite number of steps the current entering the coils 14—14 is reversed in direction so that positive current enters by the binding post 91 instead of by the binding post 88, whereupon the left hand end of the armature 23 is drawn up to the left hand core 10, causing the upper end of the arm 24 to move to the right, carrying driving pawl 29 with it. The edge $29^3$ of the driving pawl 29 will engage with a tooth on the sector B and cause the sector to rotate clock-wise about the shaft 38, and at the same time driving pawl 29 by means of the downwardly extending loop $29^4$ will cause the holding pawl 51 to engage with a tooth on the sector B and thus hold it from returning to normal position when the driving pawl releases it. Successive impulses of positive current entering by the binding post 91 cause a step by step rotation of the sector B about the shaft 38, which movement is transmitted to the contact arm 41 by virtue of the fact that sector B is rigidly connected with bushing 40 and contact arm 41 is firmly clamped about the bushing 40. If the combination of the particular device, as has been hereinbefore assumed, should be three steps on sector A and five steps on sector B, then at the termination of the movement the sector B, caused by the five successive impulses of positive current entering at the binding post 91, the contact arm 41, bearing the extension contact piece 62, will have been moved to such a position that the right angled extension on the extension contact piece 62 will be directly under the plunger 61 as shown in Fig. 6. If then the current is again reversed a positive current entering at the binding post 88 the armature will be actuated so that the upper end of arm 24 will be moved to the left, carrying with it the driving pawl 32, which now will engage with the tooth $60^3$ on the release arm 60, which it was unable to do when it was previously actuated, for the arm $32^7$ rested upon the tail end of sector B as shown in Fig. 27, which was in a plane higher than the plane of the tooth $60^3$ of the release arm 60, but as sector B has now been rotated a certain extent about shaft 38, the tail of sector B has been lowered, thereby allowing the driving pawl 32 to reciprocate in a lower plane so that the arm $32^8$, upon being moved to the left, is enabled to engage with the tooth $60^3$ of the release arm 60, causing the release arm to rotate about pin 58 as shown in Fig. 6., so that the plunger 61 attached to its end will be depressed, which causes in turn the depression of the right angled extension of the extension contact piece 62 against the action of the spring 65 and causes the insulating bone tip 97 to engage with an outer contact strip, such as 79, causing it to move inwardly and make contact with an inner contact strip, such as 78, thereby forming a path for alternating current which may be impressed upon the two line wires by connecting both line wires with one pole of a source, so that the alternating current can then pass from the binding posts 88 and 91 to and through both coils 14—14 passing to binding posts 89 and 90, and from hence by means of the wires 104 and 105 passes to and through the non-inductive resistance 2, leaving at a central point by means of the wire 96, passing to a contact strip 78 and if a wire is connected to contact strip 79, pass to and through any electrically operated device, thereby causing its operation, returning to the source of alternating current at the central station by a wire connected between the other side of the electrically operated device to the ground.

When driving pawl 32 engages release arm 60, the part $32^2$ does not engage release dog 49, as the driving pawl 32 is raised by release arm 60 as it is reciprocated by arm 24, consequently release dog 49 engages notch $50^2$, ready to push holding pawl out of engagement with sector A when the release arm 60 drops. As long as the positive impulse of electricity entering by the binding post 88 last mentioned is maintained the release arm 60 is maintained in its operative position, plunger 61 is held depressed and contacts 78 and 79 are maintained in position, so that the electrically operated device, whatever it may be, at the station where the selective device is, remains energized, but as soon as the current ceases the armature 23 returns by virtue of the spring 21 and the centering rod 22 to its central position carrying with it the driving pawl 32, which, of course, allows the release arm 60 to fall to its normal position, but in so doing the release arm 60 through the release dog 49 carried thereby, causes the pawl 50 as shown in Fig. 26, to be moved out of holding position which action is aided by spring 98 bearing down upon it and causes by its outward push the holding pawl 50 to disengage the tooth on the sector A, with which it was in engagement, thereby allowing sector A to fall to normal position, being aided thereby by the lead $A^2$ fastened thereto. When the sector A has almost reached normal position the tail $A^1$ contacts with the pin 51′, causing the holding pawl 51 to move outwardly and release sector B, which thereupon also returns to normal position.

By properly adjusting the arm 41 on the bushing 40 and the arm 44 on the bushing 43, the combination necessary to operate the device, may be varied within the limits of the device, that is to say, arm 41 may be so placed upon bushing 49 that any number of teeth in the sector B must be advanced in order to bring the arm 41 into such a position that any number of teeth must be advanced on the sector A in order to bring the arm 44 on the bushing 43 into such a position that the plunger 61, and the right angled extension on the extension contact piece 62 will be in alinement at the moment the release arm 60 is actuated by dog 32. It will thus be seen that by using suitable combinations any number of open circuits may be closed at a distant station, one at a time, by an operator at a remote point.

In a great many cases it is necessary to call all of the remote stations at one time either to deliver a general order or for testing purposes, and by the use of this selector it may be done. If the operator at the central station desires to call all remote stations he sends out such a number of impulses of the proper polarity as will move sector A around farther than it would be moved by the impulses of any combination used to operate the selectors for individual calls whereupon pin 113 will press springs 111 and 112 together and so complete a local circuit connected therewith.

We wish it to be understood that we do not desire to be limited to the exact details of construction shown and described, for obvious modifications will occur to a person skilled in the art.

Having particularly described the construction of one embodiment of our invention and explained the operation and principle thereof, what we claim as new and desire to protect by Letters Patent is:—

1. In a selective signaling device, in combination, magnetizing coils, cores within the coils, an armature capable of oscillation, an arm attached to the armature, driving pawls carried by the arm, an electric contact, a plurality of sectors driven by the driving pawls, and means governed by the sectors for coöperating to close the electric contact.

2. In a selective signaling device, toothed sectors, arms connected therewith, a plunger guided by one arm, a spring pressed pivoted extension on the other arm, pairs of contacts lying in line with the plunger and extension when the plunger and extension are in operative position, and means to operate the plunger to move the pivoted extension and operate a pair of contacts.

3. In a selective signaling device, a three position armature, an arm carried by the armature, driving pawls carried by the arm, toothed sectors actuated by the driving pawls, arms moved by the sectors, contacts closed by the coöperation of the arms.

4. In a selecting device, a part to be moved, teeth on said part, means for moving said part, a pawl pivoted below its center of gravity for holding the said part in moved position, a finger actuated by said means to move the pawl positively into engagement with the teeth on the said part, said pawl remaining in engagement by reason of gravity.

5. In a selecting device, a polarized armature means for oscillating the armature, two open circuits, means actuated by the armature to close one of the circuits by upward movements of both ends of the armature above normal, upward movements of one end only of the armature above normal closing the other circuit.

6. In a selector, a plurality of sectors, means to move said sectors, a plunger movable in unison with one of said sectors, a pivoted lever movable in unison with another of said sectors, said plunger and lever adapted to be brought by a predetermined movement of both said sectors into a position wherein they may coöperate, and normally separated metallic members brought into contact by the coöperation of said plunger and lever.

7. In a selector, a plurality of movable members, means including a plurality of drivers to move said members into a position wherein they may mechanically coöperate, normally separated metallic members brought into contact when said members coöperate, means operated by one of said drivers to cause said first mentioned members to coöperate and thus cause said normally separated metallic members to touch each other.

8. In a selector, a plurality of movable members, means including a plurality of drivers to move said members into a position wherein they may coöperate, means operated by one of said drivers to cause said members to coöperate, means to utilize such coöperation to cause an electrical change.

9. In an electrically operated selector, two sectors, magnetizing coils, cores within the coils, an armature governed by the cores, a driving pawl actuated by the armature for moving one of the sectors by a flow of electricity in one direction, means for holding the sector in the moved position, another driving pawl actuated by the armature for moving the other sector by a flow of electricity in the other direction, means for holding the last mentioned sector in the moved position, normally separated metallic contacts, and means actuated by the driving pawl operated by a flow of electricity in the first mentioned direction and governed by the extent of movement of both said sectors to cause said metallic contacts to touch each other.

10. In an electrically operated selector, two sectors, magnetizing coils, cores within the coils, an armature governed by the cores, a driving pawl actuated by the armature for moving one of the sectors by a flow of electricity in one direction, means normally inoperative for holding said sector in the moved position, means attached to the driving pawl for moving said first mentioned means into position to hold said sector in moved position, a second driving pawl actuated by the armature for moving the other sector by a flow of electricity in the other direction, means normally inoperative for holding said last mentioned sector in the moved position, means attached to said second mentioned driving pawl for moving said third mentioned means into a position to hold said last mentioned sector in the moved position, normally separated metallic contacts, and means actuated by the driving pawl operated by a flow of electricity in the first mentioned direction and governed by the extent of movement of both said sectors to cause said metallic contacts to touch each other.

11. In an electrically operated selector, two sectors, magnetizing coils, cores within the coils, an armature governed by the cores, a driving pawl actuated by the armature for moving one of the sectors by a flow of electricity in one direction, means normally inoperative for holding said sector in the moved position, means governed by said driving pawl for moving said first mentioned means into position to hold said sector in moved position, a second driving pawl actuated by the armature for moving the other sector by a flow of electricity in the other direction, means normally inoperative for holding said last mentioned sector in the moved position, means governed by said second mentioned driving pawl for moving said third mentioned means into a position to hold said last mentioned sector in the moved position, normally separated metallic contacts, and means actuated by the driving pawl operated by a flow of electricity in the first mentioned direction and governed by the extent of movement of both said sectors to cause said metallic contacts to touch each other, and means positioned by said last mentioned means to cause all parts to return to original position when the last mentioned flow of electricity ceases.

12. In a selector, an armature, said armature having an arm attached thereto, a plurality of pivoted sectors, teeth formed on said sectors, driving pawls pivotally attached to said arm and extending in opposite directions therefrom so positioned that one driving pawl is adapted to engage the teeth of one of the sectors and another of the driving pawls is adapted to engage the teeth of another of the sectors, means to oscillate the armature thereby oscillating the driving pawls and thereby oscillating the sectors, means to hold the sectors in the oscillated position, a plunger positioned by the movement of one of the sectors, a pivoted lever positioned by the movement of another of the sectors, and means actuated by one of said driving pawls for causing the plunger to oscillate the lever and for causing all parts to return to initial position, and contacts closed by the oscillation of the lever.

13. In a selective signaling device, in combination: an armature; means to oscillate the armature; driving pawls oscillated by the armature; a circuit controller; a plurality of sectors driven by the pawls; means positioned by the sectors and actuated by one of the driving pawls for actuating the circuit controller.

14. In a selective signaling device, toothed sectors, arms connected therewith, a plunger guided by one arm, a spring pressed pivoted extension on the other arm, a circuit controller lying in a plane with the plunger and extension when the plunger and extension are in operative position, and means to operate the plunger to move the pivoted extension and actuate the circuit controller.

15. In a selector, a plurality of sectors, means to move said sectors, a plunger movable in unison with one of said sectors, a pivoted lever movable in unison with another of said sectors, said plunger and lever adapted to be brought by a predetermined movement of both said sectors into a position wherein they may coöperate, and a circuit controller operated by the coöperation of said plunger and lever.

16. In a selective signaling device, in combination, magnetizing coils, cores within the coils, an armature capable of oscillation, driving pawls actuated by the armature, an electric contact, a plurality of sectors driven by the pawls, and means governed by a conjoint action of the sectors to close the electric contact.

MAURICE F. GEER.
RICHARD C. LEAKE.

Witnesses:
HENRIETTA VOSBURGH,
WM. R. GLAVIN.